Jan. 9, 1968 J. CARNEGIE 3,362,750
MINING APPARATUS HAVING PROGRAMMED CUTTING
DIRECTION AND ATTITUDE CONTROLS
Filed Oct. 22, 1965 5 Sheets-Sheet 1

INVENTOR
JAMES CARNEGIE
BY
Orland M. Christensen
ATTORNEY

INVENTOR
JAMES CARNEGIE
BY
Arland M. Christensen
ATTORNEY

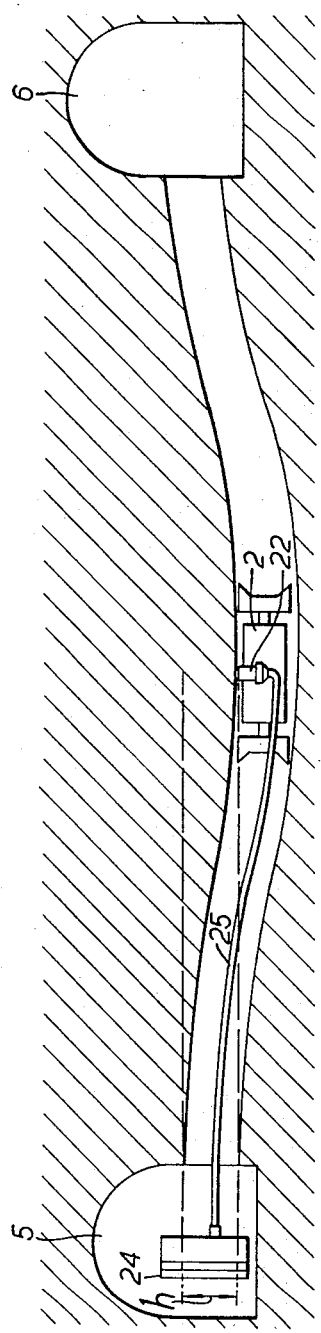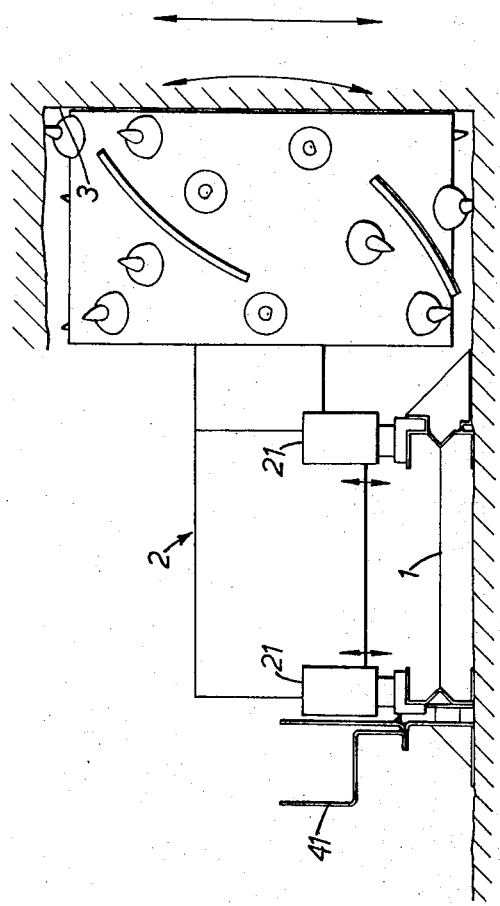

Jan. 9, 1968   J. CARNEGIE   3,362,750
MINING APPARATUS HAVING PROGRAMMED CUTTING
DIRECTION AND ATTITUDE CONTROLS
Filed Oct. 22, 1965   5 Sheets-Sheet 5

INVENTOR
JAMES CARNEGIE
BY
Orland M. Christensen
ATTORNEY

United States Patent Office 3,362,750
Patented Jan. 9, 1968

3,362,750
MINING APPARATUS HAVING PROGRAMMED CUTTING DIRECTION AND ATTITUDE CONTROLS
James Carnegie, Cheltenham, England, assignor to Dowty Electrics Limited
Filed Oct. 22, 1965, Ser. No. 500,641
Claims priority, application Great Britain, Oct. 26, 1964, 43,558/64
5 Claims. (Cl. 299—1)

ABSTRACT OF THE DISCLOSURE

This disclosure relates to mining apparatus which includes a cutting machine which advances into a mine seam, distance sensing means for sensing the distance cutting machine travels into the seam from a predetermined position, and steering means for steering the cutting machine as it travels into the mine seam, the steering means including an adjustable programmer controlling the cutting direction, height and attitude of the cutting machine in accordance with the sensed distance through which the cutting machine has traveled into the mine seam. The system disclosed includes a comparator for sensing a departure of the cutting machine from its programmed cutting direction or height and operable to actuate means for correcting the direction, height or pitch or roll attitude in accordance with the sensed departure.

*Summary and description of the invention*

This invention relates to mining apparatus including a cutting machine which travels into a mine seam.

The present invention provides mining apparatus including a cutting machine which travels into a mine seam, distance sensing means for sensing the distance of the cutting machine from a predetermined position as it travels into the mine seam, and steering means for steering the cutting machine as it travels into the mine seam, the steering means including an adjustable programmer which controls a cutting direction of the cutting machine according to its distance from the predetermined position as sensed by the distance sensing means.

The steering means may be operable to adjust the pitch attitude of the cutting machine by adjusting it angularly about a substantially horizontal axis which is substantially perpendicular to the direction of travel, the programmer controlling the pitch attitude according to the said distance. The steering means may also be operable to adjust the roll attitude of the cutting machine by adjusting it angularly about an axis substantially parallel to the direction of travel, the programmer controlling the roll attitude. The programmer may control the roll attitude according to the said distance, or to a predetermined fixed value. The steering means may include fluid-pressure-operated jacks for adjusting the or each attitude of the cutting machine. The or each attitude of the cutting machine may be sensed by an attitude senser including a pendulum which actuates an electrical device to give an electrical signal of the attitude.

The mining apparatus may include sensing means for sensing the vertical position of the cutting machine relative to a given position, the programmer being arranged to store information regarding the desired height of the cutting machine relative to the given position according to the distance of the cutting machine from the predetermined position, and the programmer being responsive to the actual height as sensed by the height sensing means to control the pitch attitude accordingly. The height sensing means may include a tube substantially filled with liquid and having one end portion carried by the cutting machine and the other end portion located at the given position.

The programmer may be adjustable by steering the cutting machine by manual controls as it travels into the mine seam.

Figure 1:
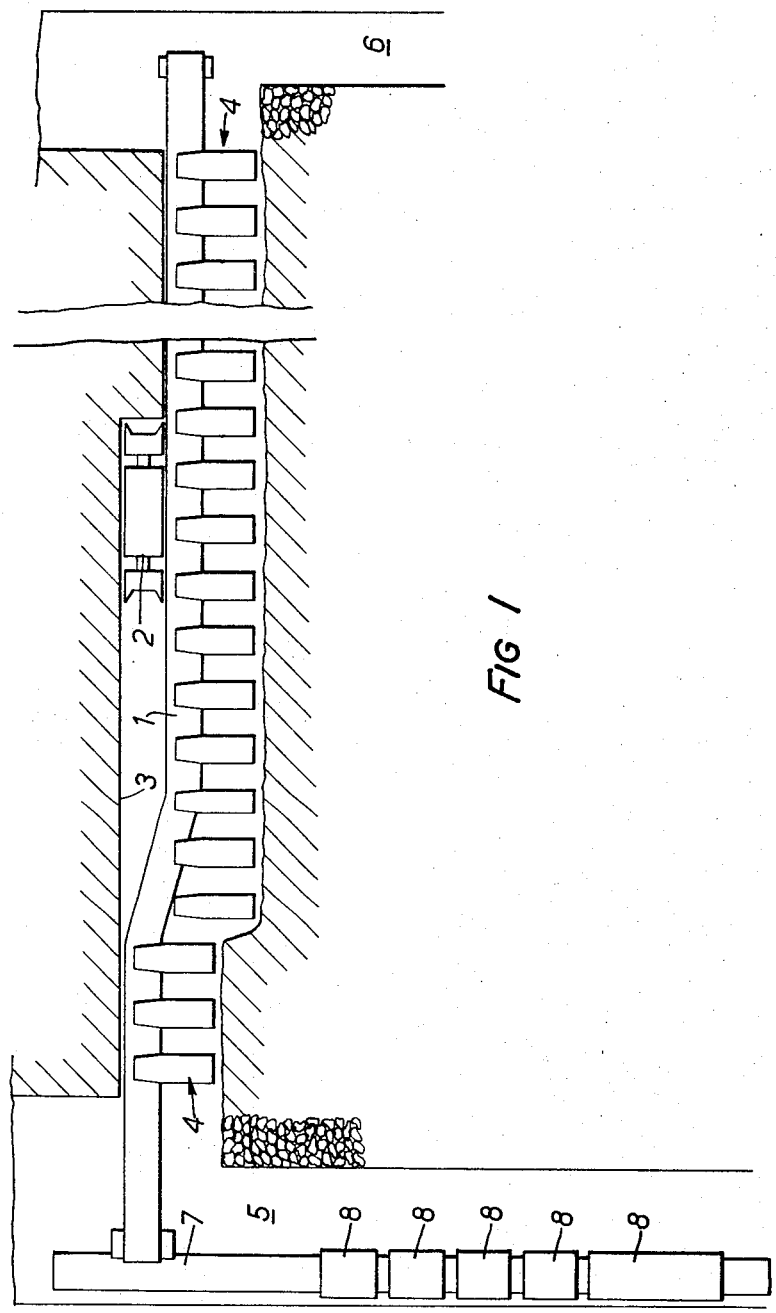
Figure 2:
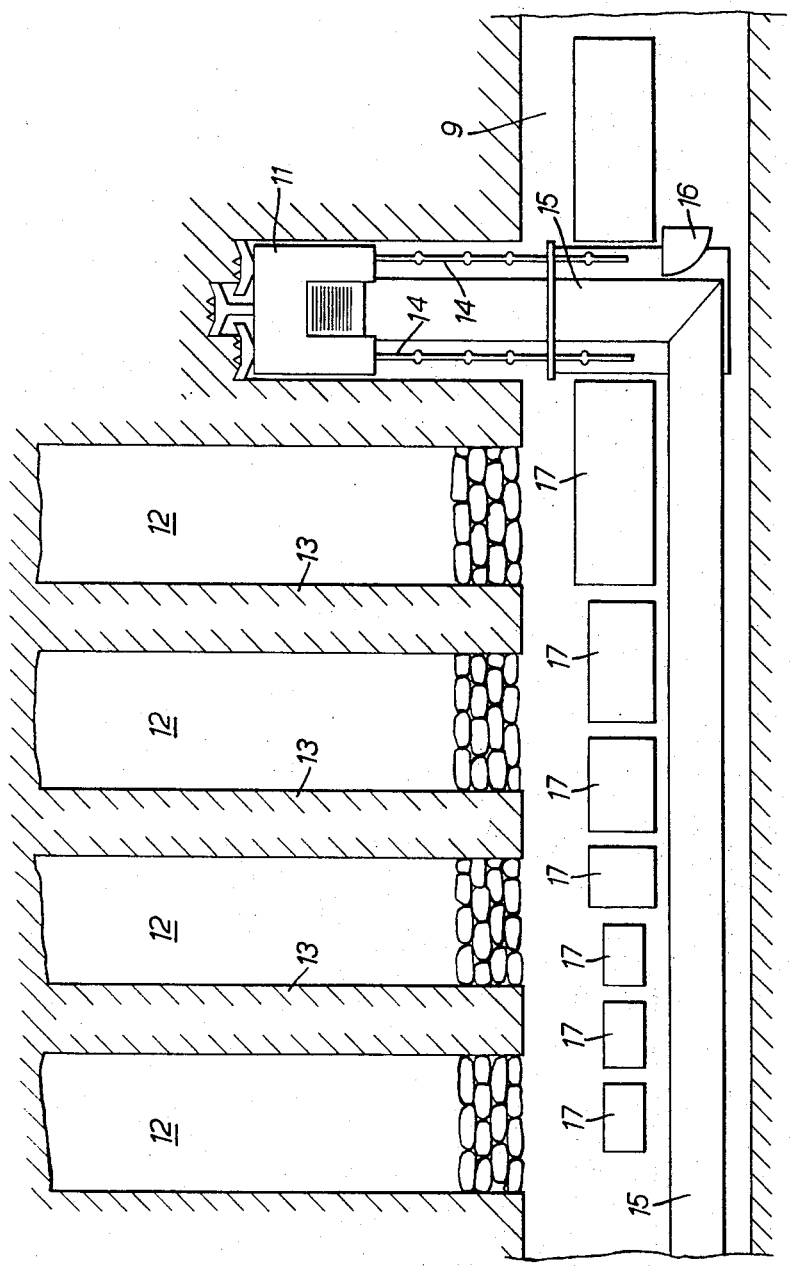
Figure 3:
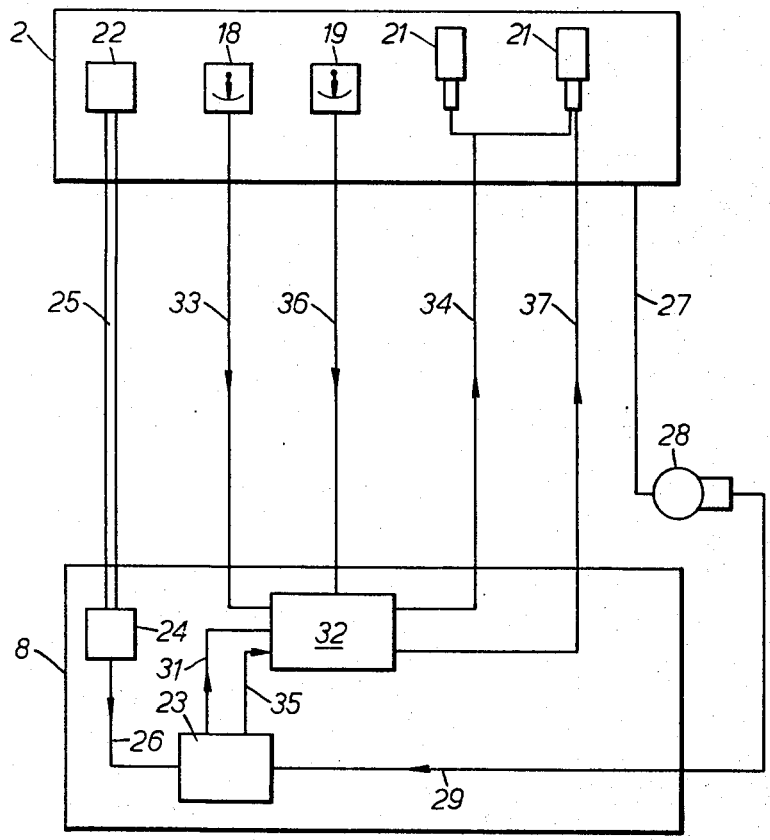
Figure 6:
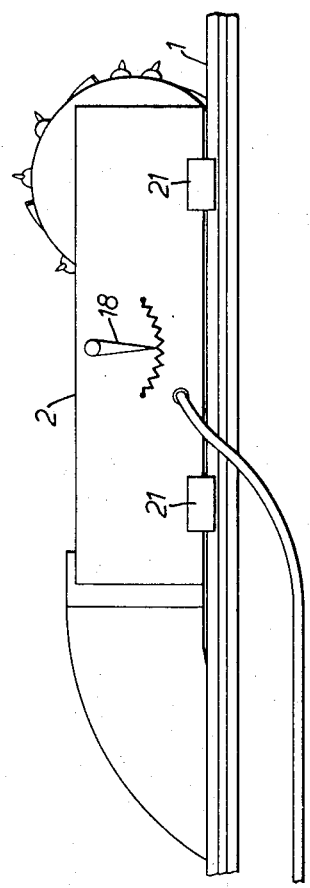
Figure 7:
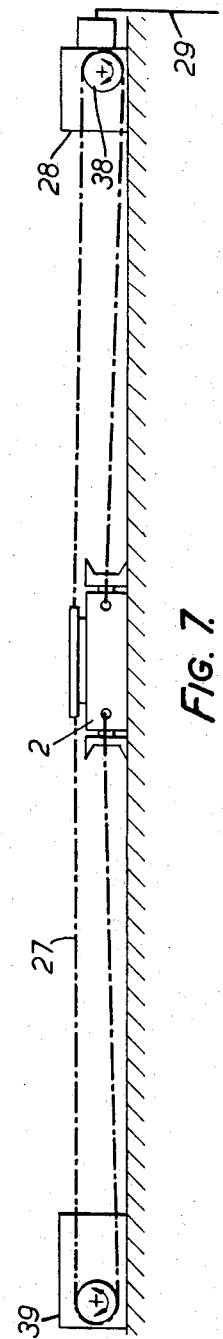

One embodiment of the present invention will now be described, by way of example, with reference to the accompanying diagrammatic drawings of which:

FIGURE 1 is a plan view of a longwall face and associated roadways of a coal mine, FIGURE 2 is a plan view of part of a coal mine in which a cutting machine cuts a series of separate tunnels into the material to be mined and leaves a pillar of material between each pair of adjacent tunnels, FIGURE 3 is a circuit diagram showing steering control apparatus for the cutting machine according to one embodiment of the invention, FIGURE 4 is a side view of a mine seam, FIGURE 5 is a front view of the cutting machine, FIGURE 6 is a side view of the cutting machine, and FIGURE 7 shows the manner of operation of the cutting machine position indicator.

Referring to the accompanying drawings, FIGURE 1 shows a coal mine face of the kind known as a longwall face. A face conveyor 1 extends along a gallery in the coal seam, and a cutting machine 2 guided by the conveyor 1 travels to and fro along the working face 3. A series of roof supports 4 are located on opposite sides of the conveyor 1 to the cutting machine 2 and working face 3. As the cutting machine 2 travels along the working face 3 and cuts material therefrom, the portions of the conveyor 1 which have been passed by the cutting machine 2 are advanced towards the working face 3, and the corresponding roof supports 4 are then advanced. The space behind the advanced roof supports is either packed with unwanted material from another part of the mine or is filled by roof fall. Roadways 5, 6 communicate with opposite ends of the gallery. One roadway 5 contains a conveyor 7 which receives mined material from the face conveyor 1. The roadway conveyor 7 may carry apparatus 8 for remotely controlling the cutting machine 2, face conveyor 1 and roof supports 4. Apparatus for remotely controlling a face conveyor and roof supports is described in my copending U.S. application Ser. No. 238,587, filed Nov. 19, 1962, now Patent No. 3,285,015.

FIGURE 2 shows another kind of coal mine working which is especially useful when the height of the seam of the material to be mined is relatively small, that is to say about 2 or 3 feet. A roadway 9 extends along the seam, and a cutting machine 11 is caused to cut a series of separate tunnels 12 in the seam, leaving a pillar of material 13 between each pair of adjacent tunnels 12. The cutting machine 11 is forced into each tunnel 12 by thrust rods 14, and the cutting machine 11 feeds the material it cuts onto a conveyor 15 which is attached to the cutting machine 11 and is pulled into the tunnel 12 from the roadway 9 by the cutting machine 11, the conveyor 15 including an angle station 16 which turns the actual conveying elements of the conveyor 15 through a right angle. The cutting machine 11 and conveyor 15 are controlled by control apparatus 17 located in the roadway and mounted on rails (not shown).

This invention is applicable to the cutting machine 2 shown in FIGURE 1 and to the cutting machine 11 shown in FIGURE 2, but for convenience the embodiment will be described in connection with the cutting machine 2 shown in FIGURE 1.

The cutting machine 2 is guided in a lateral sense by the conveyor 1. However, the seam may not be horizontal, and it is therefore necessary to also steer the cutting machine 2 in the vertical sense. It is with this aspect of steering that this invention is concerned. FIGURE 3 shows a circuit diagram of apparatus for steering the cutting machine 2 in the vertical sense, part of the apparatus being carried by the cutting machine 2 and other parts being included in the remote control apparatus 8. FIGURES 4 to 7 are individual views of some of the parts.

The parts carried by the cutting machine 2 include a pitch senser 18 which operates to give an electrical signal of the pitch attitude of the cutting machine 2, that is to say the attitude of the cutting machine 2 about a substantially horizontal axis perpendicular to the direction of travel of the cutting machine 2. The pitch senser 18 may include a pendulum whose movement varies an electrical resistance. The cutting machine 2 also carries a roll senser 19 which operates to give an electrical signal of the roll attitude of the cutting machine 2, that is to say the attitude of the cutting machine 2 about an axis parallel to the direction of travel of the cutting machine 2. The cutting machine 2 has a series, for example four, of fluid-pressure-operated jacks 21 which act between the cutting machine and skids which slide along the conveyor 1 to control the pitch and roll attitudes of the machine. There may be two laterally-spaced front jacks 21 and two laterally-spaced rear jacks 21. The pitch attitude of the cutting machine is varied by relative movement between the front jacks and the rear jacks, and the roll attitude of the cutting machine is varied by relative movement between the jacks on one side and the jacks on the other side. FIGURE 3 shows the two front laterally-spaced jacks 21. The cutting machine 2 also carries one end portion 22 of height sensing apparatus which will be described in more detail later.

The control apparatus 8 includes a pre-set programmer 23 in which is stored information regarding the desired height of the cutting machine 2 according to its position along the working face. The control apparatus 8 also includes the other end portion 24 of the machine height sensing apparatus, the two end portions 22, 24 being connected by a tube 25. The tube 25 contains a liquid, and each end portion 22, 24 includes a vertical end portion of the tube 25. The difference in atmospheric pressure on the liquid in the end portions of the tube 25 is sensed by the end portion 24 of the height sensing apparatus which sends a corresponding electrical signal along a line 26 to the programmer 23. This signal is a measure of cutting machine height relative to the control apparatus 8.

A haulage cable 27 connected to the machine actuates a distance senser 28 which sends to the programmer 23 along a line 29 an electrical signal of the position of the cutting machine 2 along the working face relative to the roadway 5.

Thus the programmer 23 receives information regarding the height of the cutting machine 2 and its position along the working face 3. The programmer 23 compares the actual height of the cutting machine 2 with the programmed height according to the distance of the cutting machine 2 from the roadway 5, and if there is an error sends a signal along a line 31 to a comparator and amplifier 32 of the desired pitch attitude of the cutting machine 2 to correct the height within a predetermined further distance of travel of the cutting machine 2.

The comparator and amplifier 32 also receive an electrical signal along a line 33 from the pitch senser 18 of the actual pitch attitude of the cutting machine 2. The comparator and amplifier 32 compares the actual pitch attitude with the desired pitch attitude, and if there is an error sends an electrical signal along a line 34 to adjust the jacks 21 accordingly. The jacks 21 will preferably be controlled by electric-hydraulic solenoid valves.

The roll attitude may be controlled from the roll senser 19 in a similar manner, with the programmer 23 sending an electrical signal of desired roll attitude for the machine position along a line 35 to the comparator and amplifier 32, which compares the desired roll attitude with the actual roll attitude according to an electrical signal sent along a line 36 from the roll senser 19. If there is an error, the comparator and amplifier 32 then sends an electrical signal along a line 37 to the jacks 21 to adjust the roll attitude of the cutting machine 2 accordingly.

FIGURE 4 is a side view of the coal seam, and shows the height sensing apparatus with end portions 22, 24 connected by the tube 25. FIGURE 5 is a front view of the cutting machine 2 showing the two front laterally-spaced jacks 21. FIGURE 6 is a side view of the cutting machine 2 showing one front jack 21 and one rear jack 21 on one side of the cutting machine 2, and showing the pitch senser 18. FIGURE 7 shows the distance senser 28 which is driven by an idling sprocket 38 at the opposite end of the working face 3 to a power unit 39 which drives the haulage cable 27 to pull the cutting machine 2 along the working face 3.

The programmer 23 may store the revelant information regarding machine height according to machine position along the working face by means of a magnetic information-storage device. The information may be fed into the information-storage device by the height sensing apparatus on an initial run of the cutting machine 2 along the working face 3 during which the roll and pitch attitudes of the cutting machine 2 are manually controlled. On subsequent runs, the pitch and roll attitudes are controlled by the programmer 23. It is also possible to feed a calculated programme into the information-storage device or to feed the information into the information-storage device from a suitable transducer taken along the working face 2.

In some circumstances, it may not be necessary to control the roll attitude at all, or only to control the roll attitude to a predetermined fixed value. Also, in some circumstances, the height sensing means may not be necessary, in which case the programmer 23 would store information regarding the desired pitch attitude and may be the desired roll attitude according to machine position along the working face 3.

The electric lines 33, 34, 36, 37 and the tube 25 which extends from the remote control apparatus 8 to the cutting machine 2 will be located inside an armoured hose which is carried by a cable handler 41 secured to the conveyor 1 (see FIGURE 5).

If desired, the programmer 23 and comparator and amplifier 32 may be carried by the cutting machine 2 instead of being included in the remote control apparatus 8.

The pitch and/or roll attitudes of a cutting machine of the kind shown in FIGURE 2 which travels along the floor rather than along a conveyor may be controlled by fluid-pressure-operated jacks which act between the machine and a sledge or skids by which the machine is carried.

I claim as my invention:

1. Mining apparatus including a cutting machine which travels into a mine seam, means to sense the distance which the machine has traveled into the seam from a predetermined position, steering means operatively connected to the cutting machine to control at least its pitch attitude, and consequently its height relative to such predetermined position, as it travels into the seam, a programmer programmed to actuate said steering means in accordance with the distance the cutting machine has advanced into the seam, means to sense the height of the cutting machine relative to the predetermined position, as the machine advances into the seam, and means to interconnect the height-sensing means and the programmer for actuation of the steering means by the programmer in accordance with the sensed height as compared with the programmed height at the sensed distance.

2. Mining apparatus comprising a cutting machine which travels into a mine seam; distance sensing means for sensing the distance of the cutting machine from a predetermined position as it travels into the mine seam;

height sensing means for sensing the vertical position of the cutting machine relative to a given vertical position; and steering means for steering the cutting machine as it travels into the mine seam, the steering means including means operable to adjust the pitch attitude of the cutting machine by adjusting it angularly about a substantially horizontal axis which is substantially perpendicular to the direction of travel, and an adjustable programmer operable to store information regarding the desired height of the cutting machine relative to said given vertical position according to the distance of the cutting machine from said predetermined position, said programmer being responsive to the actual height of the cutting machine as sensed by the height sensing means and operable to control the pitch attitude and cutting direction of the cutting machine according to its distance from said predetermined position as sensed by the distance sensing means.

3. Mining apparatus according to claim 2 wherein the height sensing means includes a tube substantially filled with liquid and having one end portion carried by the cutting machine and the other end portion located at the given position.

4. Mining apparatus including a cutting machine which travels into a mine seam, means to sense the distance which the machine has traveled into the seam from a predetermined position, means to sense the height of the machine relative to a predetermined vertical position, steering means operatively connected to the cutting machine to control at least one of its pitch or its roll attitude as it advances into the seam, a programmer programmed to actuate said steering means in accordance with the distance the cutting machine has advanced into the seam, means to interconnect the distance sensing means and the programmer for actuation of the steering means by the programmer in accordance with the sensed distance, and a comparator operatively connected to the programmer and said height sensing means and to the steering means, said comparator being operable to determine any departure of the cutting machine from the programmed height for the sensed distance and to correct the steering means in accordance with such departure.

5. Mining apparatus including a cutting machine which travels into a mine seam, means to sense the distance which the machine has traveled into the seam from a predetermined position, means to sense the height of the machine relative to a predetermined vertical position, means to sense both the pitch and the roll attitudes of the cutting machine, steering means operatively connected to the cutting machine to control both pitch and roll attitudes of the cutting machine as it advances into the seam, a programmer programmed to actuate said steering means in accordance with the distance the cutting machine has advanced into the seam, means to interconnect the distance sensing means and the programmer for actuation of the steering means by the programmer in accordance with the sensed distance, and a comparator responsive to the programmer and to said pitch and roll attitude sensing means and to the height and distance sensing means, said comparator being operable to determine any departure of the cutting machine from the programmed height and position for the sensed distance and to correct the pitch and roll attitudes and direction of said cutting machine in accordance with such departure.

References Cited

UNITED STATES PATENTS 2,761,666  9/1956  Heimaster et al. _____ 299—1

FOREIGN PATENTS 1,156,035  10/1963  Germany.

OTHER REFERENCES

"Remote Control for Continuous Mine," Coal Age, August 1959, pages 98–101 included.

ERNEST R. PURSER, *Primary Examiner.*